United States Patent
Mattina et al.

(10) Patent No.: US 10,400,926 B2
(45) Date of Patent: *Sep. 3, 2019

(54) WEARABLE RUBBER PARTS FOR FLUID HANDLING SERVICES INCLUDING A POLYURETHANE INNER LAYER

(71) Applicant: Garlock Sealing Technologies, LLC, Palmyra, NY (US)

(72) Inventors: Louis J. Mattina, Palmyra, NY (US); Stephen Joseph Cramb, Palmyra, NY (US); Brandon T. Phillips, Palmyra, NY (US); Benjamin James Whipple, Palmyra, NY (US); Sherwin A. Damdar, Palmyra, NY (US)

(73) Assignee: GARLOCK SEALING TECHNOLOGIES, LLC, Palmyra, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/026,540

(22) Filed: Jul. 3, 2018

(65) Prior Publication Data

US 2018/0313484 A1 Nov. 1, 2018

Related U.S. Application Data

(63) Continuation of application No. 14/592,768, filed on Jan. 8, 2015, now Pat. No. 10,066,771.

(Continued)

(51) Int. Cl.
*F16L 27/10* (2006.01)
*F16L 55/033* (2006.01)
*F16K 7/02* (2006.01)

(52) U.S. Cl.
CPC ............ *F16L 27/1012* (2013.01); *F16K 7/02* (2013.01); *F16L 55/0337* (2013.01)

(58) Field of Classification Search
CPC ....... F16L 51/022; F16L 51/02; F16L 51/026; F16L 51/027

(Continued)

(56) References Cited

U.S. PATENT DOCUMENTS 2,692,782 A * 10/1954 Jones .................... F16L 51/024
    114/22
2,879,804 A * 3/1959 Hammond ............ F16L 51/024
    138/138

(Continued)

FOREIGN PATENT DOCUMENTS

CA    1052302 A1    4/1979
CN    2129861 Y    4/1993

(Continued)

OTHER PUBLICATIONS

International Search Report and Written Opinion, Issued for PCT/US2015/010659 by the International Search Authority of Korea dated Apr. 16, 2015. 15 pages.

*Primary Examiner* — Aaron M Dunwoody
(74) *Attorney, Agent, or Firm* — Perkins Coie LLP (57) ABSTRACT

Wearable rubber parts for fluid handling systems include a four layer structure, wherein the inner most layer of the four layer structure is a polyurethane layer. The polyurethane can be millable polyurethane. The polyurethane used in the inner most layer can be produced by reacting diisolcyanate with a polyester and/or polyether polyols and a chain extender. The wearable rubber part can be an expansion joint, a pinch valve, or a hose.

16 Claims, 7 Drawing Sheets

Related U.S. Application Data (60) Provisional application No. 61/925,009, filed on Jan. 8, 2014.

(58) Field of Classification Search
USPC .................................................. 285/229, 226
See application file for complete search history.

(56) References Cited

U.S. PATENT DOCUMENTS

| | | | | |
|---|---|---|---|---|
| 2,998,986 A | | 9/1961 | Buono | |
| 3,039,795 A | * | 6/1962 | Reuter | F16L 51/024 285/235 |
| 3,051,512 A | * | 8/1962 | Cranston | F16L 51/024 285/114 |
| 3,139,115 A | | 6/1964 | Bawcom et al. | |
| 3,315,704 A | * | 4/1967 | Shire | F16L 27/11 138/121 |
| 3,359,014 A | | 12/1967 | Clements | |
| 3,363,918 A | * | 1/1968 | Fisher | F16L 27/108 285/229 |
| 3,429,592 A | * | 2/1969 | Merkwacz | F16L 51/024 285/229 |
| 3,446,248 A | * | 5/1969 | Press | F16L 11/10 138/133 |
| 3,550,639 A | * | 12/1970 | Okudo | F16L 27/12 138/109 |
| 3,580,616 A | * | 5/1971 | Merkwacz | F16L 27/108 285/229 |
| 3,633,945 A | | 1/1972 | Press et al. | |
| 3,831,635 A | * | 8/1974 | Burton | F16L 35/00 138/103 |
| 4,101,150 A | * | 7/1978 | Thawley | E02F 7/10 285/226 |
| 4,127,039 A | * | 11/1978 | Hollaway, Jr. | F16G 5/06 152/451 |
| 4,132,382 A | | 1/1979 | Jackson | |
| 4,142,554 A | * | 3/1979 | Washkewicz | F16L 11/086 138/109 |
| 4,241,944 A | * | 12/1980 | Clark | F16L 33/28 285/229 |
| 4,250,223 A | * | 2/1981 | Cook | B32B 15/08 442/233 |
| 4,349,049 A | * | 9/1982 | Silvey | A01G 23/099 138/103 |
| 4,386,796 A | * | 6/1983 | Lyall | F16L 25/12 285/302 |
| 4,536,018 A | * | 8/1985 | Patarcity | F16L 27/108 285/229 |
| 4,571,230 A | * | 2/1986 | Woodland | F16G 5/20 474/263 |
| 4,611,832 A | * | 9/1986 | Matsuoka | F16L 11/045 118/DIG. 11 |
| 4,657,526 A | * | 4/1987 | Tangorra | F16G 5/20 474/261 |
| 4,887,848 A | | 12/1989 | Burba | |
| 5,145,191 A | * | 9/1992 | Stewart | F16D 3/845 277/636 |
| 5,147,695 A | * | 9/1992 | Colley | B29C 70/14 138/120 |
| 5,174,613 A | * | 12/1992 | Joug | F16J 3/042 285/200 |
| 5,484,173 A | * | 1/1996 | Baker | F16L 51/02 138/137 |
| 5,573,284 A | * | 11/1996 | Boyer | F16L 51/02 285/187 |
| 5,868,437 A | * | 2/1999 | Teague | F16L 9/147 138/149 |
| 5,992,818 A | | 11/1999 | Jones et al. | |
| 6,102,361 A | | 8/2000 | Riikonen | |
| 6,412,484 B1 | * | 7/2002 | Izuchukwu | A61M 16/208 128/202.19 |
| 6,631,928 B1 | | 10/2003 | Sakata | |
| 7,478,651 B2 | | 1/2009 | Simpson | |
| 8,479,775 B2 | * | 7/2013 | Swails | F16L 11/088 138/109 |
| 8,671,993 B2 | * | 3/2014 | Yoon | F16L 27/111 138/118 |
| 2004/0050440 A1 | * | 3/2004 | Vohrer | E03C 1/021 138/109 |
| 2005/0023829 A1 | * | 2/2005 | Matzen | F16L 27/108 285/223 |
| 2006/0054231 A1 | * | 3/2006 | Wolfram | B65G 53/32 138/109 |
| 2006/0276612 A1 | | 12/2006 | Shirasaka | |
| 2008/0174110 A1 | * | 7/2008 | Olson | B29C 63/34 285/55 |
| 2010/0102551 A1 | * | 4/2010 | Zeiber | F16L 33/23 285/253 |
| 2012/0146324 A1 | * | 6/2012 | Keyes | F16L 59/21 285/187 |
| 2013/0270818 A1 | * | 10/2013 | Chung | F16L 23/032 285/223 |
| 2016/0146394 A1 | * | 5/2016 | Richter | F16L 27/1085 285/93 |

FOREIGN PATENT DOCUMENTS

| | | |
|---|---|---|
| CN | 2173892 Y | 8/1994 |
| CN | 201066019 Y | 5/2008 |
| CN | 201858476 U | 6/2011 |
| CN | 202812628 U | 3/2013 |
| WO | WO 03/069199 A1 | 8/2003 |

\* cited by examiner

WEARABLE RUBBER PARTS FOR FLUID HANDLING SERVICES INCLUDING A POLYURETHANE INNER LAYER

CROSS-REFERENCE TO RELATED APPLICATION(S)

This application is a continuation of U.S. application Ser. No. 14/592,768, filed on Jan. 8, 2015 entitled "Wearable Rubber Parts For Fluid Handling Services Including A Polyurethane Inner Layer," which claims priority to U.S. Provisional Application No. 61/925,009, filed Jan. 8, 2014, the entirety of which is hereby incorporated by reference.

BACKGROUND

Many different wearable rubber parts exist for use in fluid handling services. Such wearable rubber parts provide various functions in, for example, the transport of fluid. Wearable rubber parts can be used to control the flow of fluid, provide passages for fluid flow, and connect together adjoining segments of a passage system, to name just a few examples. Specific examples of wearable rubber parts used in fluid handling services include, but are not limited to, expansion joints, pinch valves, and hoses.

Expansion joints are generally used in rigid piping systems to compensate for axial, lateral, torsional and/or angular movement and misalignment due to, for example, thermal expansion and contraction, mechanical effects, system settlement, pressure surges or changes, and system vibrations.

Pinch valves are a type of control valve that use a pinching effect to control fluid flow. When a pinch valve is open, fluid generally flows freely through the pinch valve. When a pinch valve is closed, the pinching effect obstructs fluid flow. Pinch valves are often used in systems where slurries or fluids with entrained solids are the conveyed media because the flexible rubber sleeve of a pinch valve allows the valve to close droptight around solids.

Hoses are generally hollow cylindrical passages that can be used to convey fluids over various distances. Hoses are often flexible in nature to provide some measure of freedom in arranging the hose around or over obstructions and the like. Hoses can also be designed to absorb system vibration, compensate for thermal expansion and contraction, and reduce noise.

Many previously known wearable rubber parts use certain limited elastomers as a component of the rubber part. For example, certain types of elastomers are commonly used as the inner most layer of wearable rubber parts. In addition to providing the degree of flexibility typically needed in wearable rubber parts for fluid handling services, elastomers have typically been used due to their low cost and abrasion resistance.

However, the abrasion resistance of these certain types of elastomers is less than ideal. For example, some media, such as fluids with a high amount of entrained solid particulate, will degrade the elastomers over a relatively short period of time, such that wearable rubber parts need to be replaced frequently. This decreased service life increases costs and maintenance downtime.

Because conventional elastomers generally do not have sufficient abrasion resistance for use in some highly abrasive applications, efforts have been undertaken to identify alternative materials for use as the inner most layer of wearable rubber parts. One material having higher abrasion resistance than certain types of elastomers is polyurethane. However, polyurethane has not been used as an inner most layer in wearable rubber parts because of numerous issues that would arise from the use of polyurethane.

One particular issue with the use of polyurethane as an inner most layer is that polyurethane is difficult to process into the shape needed for an inner most layer of a wearable rubber part. The viscosity of polyurethane is generally high, which makes it difficult to calendar the material into the desired shape.

Another issue is that the industry generally regards polyurethane as not having sufficient water resistance for use as an inner most layer of a wearable rubber part.

Issues also arise with respect to adhering polyurethane inner most layers to adjacent layers in the wearable rubber part composite structure. In order to provide a useful wearable rubber part, the bond between the polyurethane inner most layer and the adjacent layer must be both strong enough to resist delamination and flexible enough to permit the degree of movement required in wearable rubber parts for fluid handling. Typical adhesives are incapable of providing both of these characteristics. For example, a typical cement-like adhesive can provide the necessary bond between the polyurethane inner most layer and an adjacent layer, but the dried adhesive is brittle and therefore does not provide the required flexibility.

Due to at least one or more of the above identified issues, polyurethane has been rejected by the industry for use as an inner most layer of a wearable rubber part. However, if some or all of the problems identified above could be resolved, the use of polyurethane as an inner most layer of a wearable rubber part would be useful due to its good abrasion resistance characteristics and suitability for use in highly abrasive applications where.

SUMMARY

This Summary is provided to introduce a selection of concepts in simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some embodiments, an expansion joint suitable for use in fluid handling systems is disclosed. The expansion joint can include an inner most layer comprising polyurethane, a bonding ply layer, a reinforcement layer, and an outer layer. The polyurethane can be a millable polyurethane. The outer layer can be a flexible elastomer compound.

In some embodiments, the expansion joint comprises a cylindrical main body portion having a hollow passage extending therethrough and a flange at either end of the cylindrical main body portion. The inner most layer of the expansion joint can comprise millable polyurethane.

BRIEF DESCRIPTION OF THE DRAWINGS

Non-limiting and non-exhaustive embodiments of the methods and systems disclosed herein are described with reference to the following Figures, wherein like reference numerals refer to like parts throughout the various views unless otherwise specified.

DETAILED DESCRIPTION

Wearable rubber parts described herein generally include a polyurethane inner layer that is resistant to highly abrasive fluid and therefore overcomes some or all of the problems outlined in the Background. In some embodiments, the polyurethane is millable polyurethane, which is capable of being manufactured in the shapes required for use in wearable rubber parts. The polyurethane inner layer can be adhered to an adjacent layer using a bonding ply layer.

Wearable rubber parts having polyurethane inner layers can generally include any wearable rubber part traditionally used in fluid handling systems for the purpose of facilitating the transfer of a fluid passing through the fluid handling system. In some embodiments, the wearable rubber parts are flexible wearable rubber parts specifically designed for use in dynamic applications. The flexible wearable rubber parts are generally designed to allow for some amount of movement required in fluid handling systems, and therefore must include component parts that are also capable of flexibility and movement. Examples of wearable rubber parts include, but are not limited to, flexible expansion joints, flexible pinch valves, and flexible hoses. Fluids capable of being transported in fluid handling systems incorporating wearable rubber parts include liquids, gas, plasma, and fluids having solids suspended within the fluid.

In some embodiments, the wearable rubber parts include a four layer structure. The four layer structure includes a polyurethane inner layer, a bonding ply layer, a reinforcement layer, and an outer layer. In some embodiments, the bonding ply layer is chemically bonded to the inner most layer at one surface and mechanically bonded to the reinforcement layer at the opposing surface to thereby provide the bonding necessary for the wearable rubber part. Each layer of the four layer structure is described in greater detail below.

Expansion Joint

In some embodiments, the wearable rubber part including a polyurethane inner layer is a flexible expansion joint. Flexible expansion joints are generally used to connect adjacent units of a fluid handling system, such as two adjacent pipe segments. The flexibility of the expansion joint allows for adjacent pipe segments to move independently while still fluidly connecting the two adjacent segments.

Figure 1:
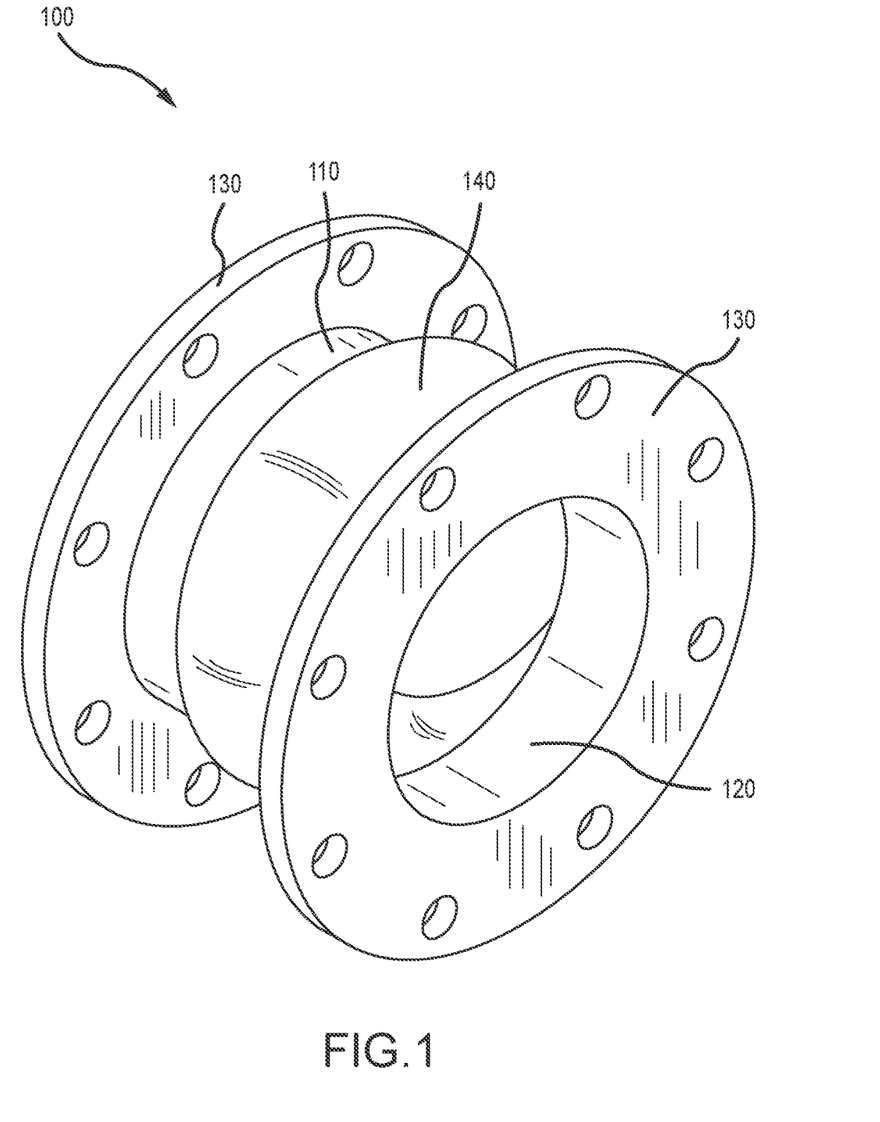
FIG. 1 is a perspective view of a flowing arch expansion joint according to various embodiments described herein.
Figure 2:
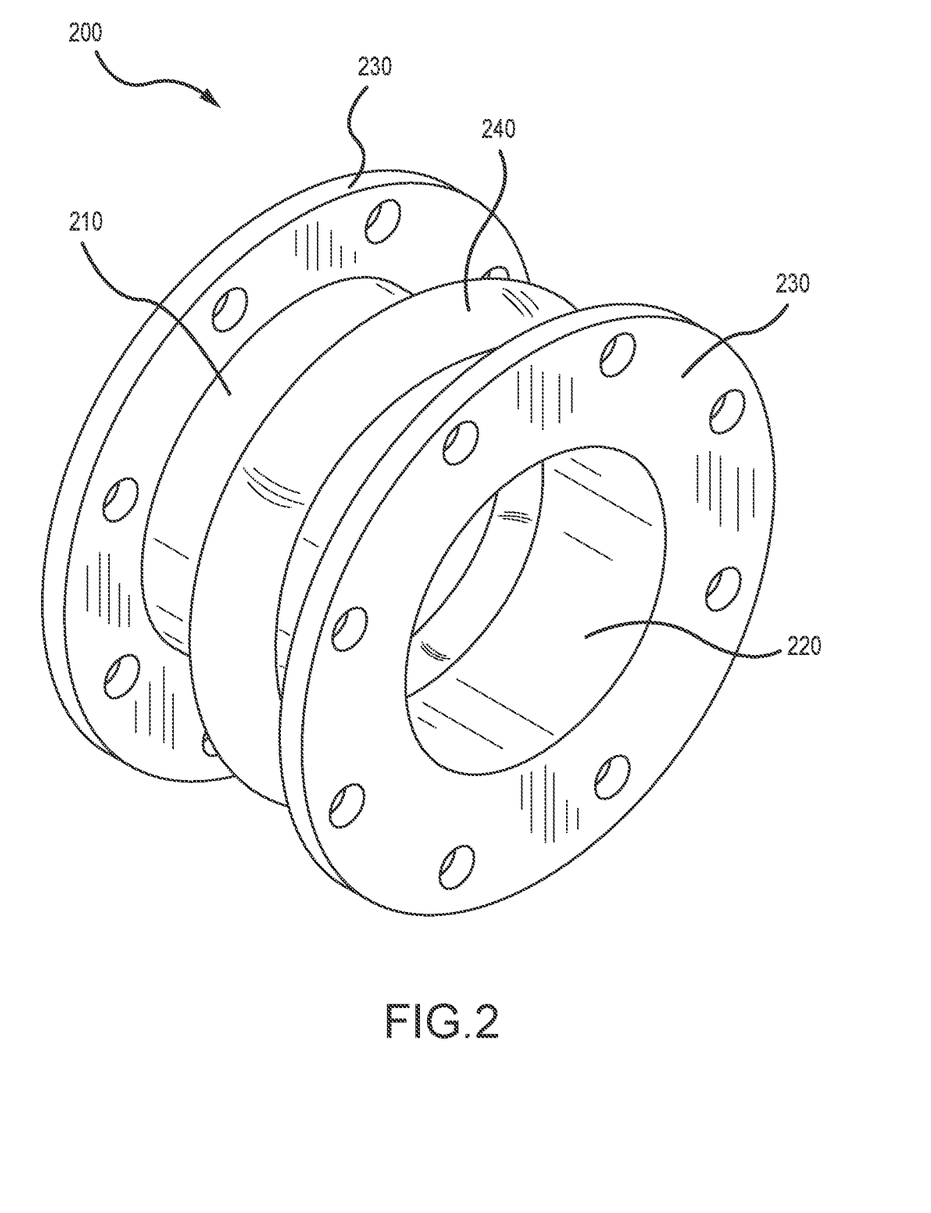
FIG. 2 is a perspective view of an abrupt arch expansion joint according to various embodiments described herein.

With reference to FIGS. 1 and 2, various embodiments of a flexible expansion joint 100, 200 described herein are shown. The flexible expansion joint 100, 200 includes a flexible, generally cylindrical main body portion 110, 210 having an inner hollow passage 120, 220 extending therethrough, and flanges 130, 230 located at opposite ends of the cylindrical main body portion 110, 210. While FIGS. 1 and 2 provide two exemplary types of flexible expansion joints, the technology described herein is not to be limited to the specifically enumerated types of flexible expansion joints.

FIG. 1 shows a flowing arch expansion joint 100, wherein the flexible cylindrical main body 110 includes a gradual arch 140 extending across a substantial portion of the length of the cylindrical main body portion 110. The flowing arch expansion joint 100 can be suitable for use in dynamic, high pressure applications where low spring rates and a self-flushing arch are required. The flowing arch expansion joint 100 can be specially designed and manufactured to compensate for permanent piping misalignment. The flowing arch expansion joint 100 can prevent sediment build-up and provide high pressure capabilities, while also providing lower spring rates. Industries using flowing arch expansion joints can include mining, power generation units with flue gas desulphurization units, and the fertilizer industry to name but a few industries.

FIG. 2 shows an abrupt arch expansion joint 200, wherein the flexible cylindrical main body 210 includes a short arch 240 extending across a minor portion of the length of the cylindrical main body 210. The abrupt arch expansion joint 200 can be suitable for use in dynamic conditions where pressure and vacuum concerns are present. The abrupt arch expansion joint 200 can be specially designed and manufactured to compensate for permanent piping misalignment. The abrupt arch expansion joint 200 can prevent sediment build-up and provide high pressure capabilities, while also providing lower spring rates. Industries using abrupt arch expansion joints can include mining, power generation units with flue gas desulphurization units, and the fertilizer industry to name but a few industries.

The dimensions of the flexible expansion joints 100, 200 shown in FIGS. 1 and 2 are generally not limited and can be adapted for the specific application of the flexible expansion joint. In some embodiments, standard size ranges include a minimum of ½" ID (inside diameter) to a maximum of 120" ID and an OD (outside diameter) size range of from 2½" to 140¼". Face to face dimensions (i.e., length) can also vary based on customer needs, but standard size ranges can be from 6" to 12". In some embodiments, a specific size range for polyurethane expansion joints are approximately 4"-48" ID.

Figure 3:
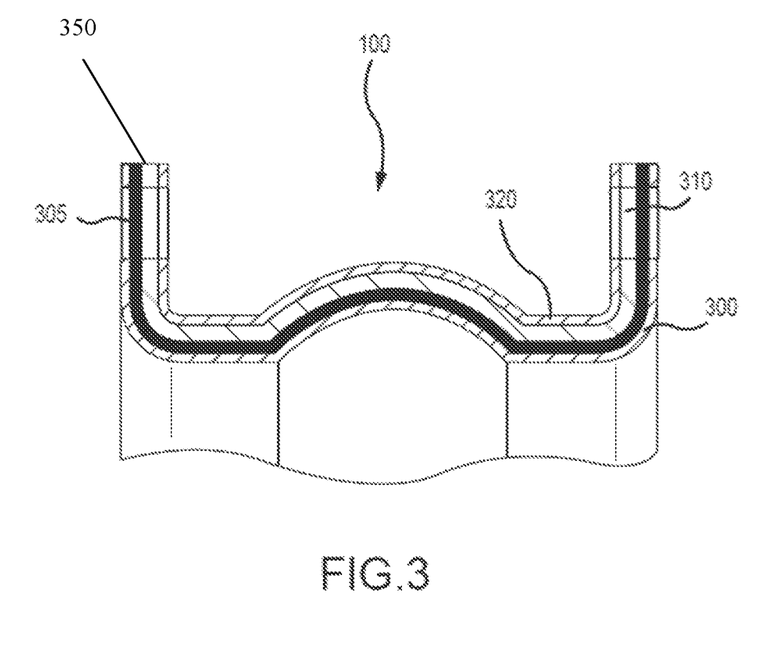
FIG. 3 is a cross-sectional view of the expansion joint shown in FIG. 1.
Figure 4:
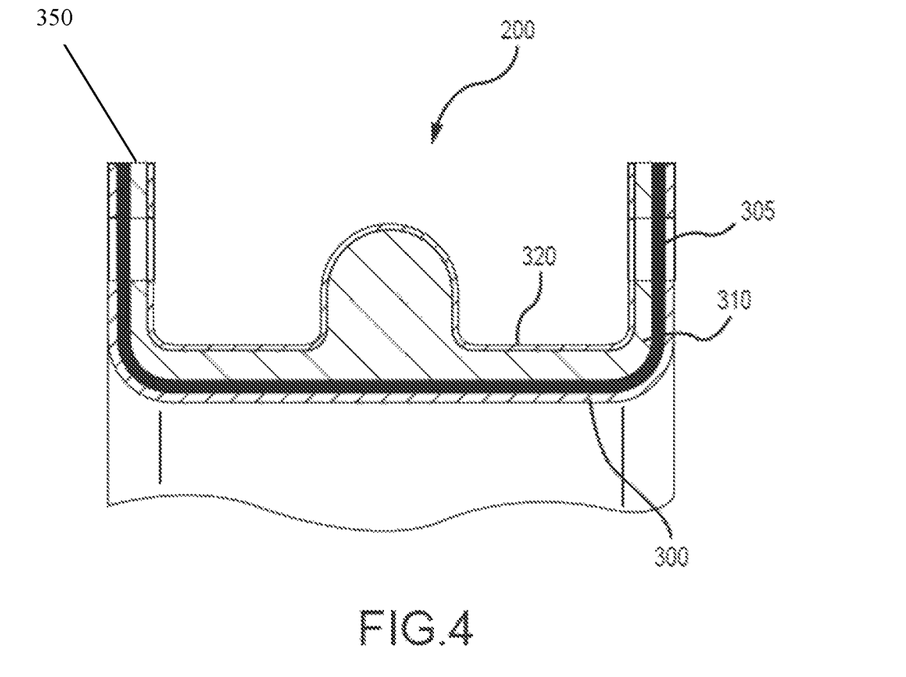
FIG. 4 is a cross-sectional view of the expansion joint shown in FIG. 2.

In some embodiments, the flexible expansion joint includes a four layer structure. With reference to FIGS. 3 and 4, the four layer structure can include an inner most layer 300, a bonding ply layer 305, a reinforcement layer 310, and an outer layer 320. FIG. 3 is a cross sectional view of the flowing arch expansion joint 100 shown in FIG. 1 and FIG. 4 is a cross sectional view of the abrupt arch expansion 200 joint shown in FIG. 2.

In some embodiments, the inner most layer 300 comprises polyurethane. In some embodiments, the inner most layer 300 is predominantly or entirely polyurethane, while in other embodiments the inner most layer 300 is less than 100% polyurethane. Other components that can be included in the inner most layer when it is less than 100% polyurethane include additives and fillers typically used in elastomer compounds (e.g., silica, clay, talc, and plasticizers). In some embodiments, the inner most layer 300 includes 70% or more polyurethane, with the remainder being additives. In some embodiments, the additive components can be included in a range of from 40 to 55 wt % of the inner most layer, in any combination, with the polyurethane content therefore being from 45 to 60 wt %.

Polyurethane can generally be classified into one of three categories: castable, thermoplastic, and millable. In some embodiments, the polyurethane used in the expansion joint described herein is millable polyurethane. Millable polyurethanes are solid polymers having properties similar to castable (liquid) urethanes while also being under-indexed urethanes, meaning that there is a stoichiometric deficiency of isocyanate groups compared to hydroxyl groups in the overall reaction. In some embodiments, the millable polyurethane is Millathane™ E34, manufactured by TSE Industries of Clearwater, Fla.

Millable polyurethanes can be made by reacting diisolcyanate with a polyol and a chain extender. The polyol used in the reaction can be a polyester, a polyether, or a combination of both. In some embodiments, the polyurethane used in the embodiments described herein is made by using only or predominantly polyether polyols in the reaction. These polyether polyols impart greater water resistance to the resulting polyurethane and thereby make the polyurethane most suitable for use in a flexible expansion joint.

In some embodiments, such as where the flexible expansion joint is for use with oil as a conveyed media, the polyols reacted to form millable polyurethane can include polyester polyols because polyester type millable polyurethane has better oil resistance then polyether type millable polyurethane. A polyester type millable polyurethane will have oil resistance equal to a Nitrile compound, while a polyether type millable polyurethane will have oil resistance between a Nitrile and Neoprene compound.

The thickness of the inner most layer is generally not limited and can be adapted to suit the specific application of the flexible expansion joint. In some embodiments, the inner most layer has a minimum thickness of ⅛". This minimum thickness helps to ensure the inner most layer is leak proof and compatible with conveyed media.

In some embodiments, the thickness of the inner most layer is uniform throughout the flexible expansion joint. In other embodiments, the thickness of the inner most layer is variable at different portions of the flexible expansion joint. For example, the thickness of the inner most layer may be smaller or larger at the flanges 350 of the flexible expansion joint. The thickness of the inner most layer can also be varied (smaller or larger) at the gradual or short arch portion of the flexible expansion joint.

The bonding ply layer 305 provides bonding between the inner most layer 300 and the reinforcement layer 310. In some embodiments, the bonding ply layer 305 is a solid layer of a rubber material disposed between the inner most layer 300 and the reinforcement layer 310 and that is capable of providing bonding sites for forming chemical bonds with the material of the inner most layer. In some embodiments, the rubber layer is a neoprene rubber layer. Other rubber layers that are capable of providing sufficient chemical bonding with the inner most layer 300 and mechanical bonding with the reinforcement layer 310 can also be used.

The thickness of the bonding ply layer is generally not limited and can be any suitable thickness necessary to provide bonding between the inner most layer 300 and the reinforcement layer 310 while also providing the flexibility needed for the manufacturing process (e.g., so that it can be wrapped around a cylindrical mold) and in the finished product. In some embodiments, the bonding ply layer has a thickness in the range of from 0.063 inches to 0.093 inches. In some embodiments, two or more bonding ply layers can be used, in which case the thickness of the composite bonding ply layer can be double or more of the thickness range provided above. Generally, the bonding ply layer will have a uniform thickness, although a bonding ply layer with a variable thickness can also be used.

At the interface between the inner most layer 300 and the bonding ply layer 305, the bond can be a chemical bond. In some embodiments, the chemical bond is between carbon chains in each of the inner most layer 300 and the bonding ply layer 305. In some embodiments, the surface of the inner most layer 300 can be treated with a solvent in order to provide bonding cites that bond with the bonding ply layer 305. This solvent treatment is described in greater detail below. Other treatments which provide the desired bonding sites can also be used.

At the interface between the bonding ply layer 305 and the reinforcement layer 310, the bond can be a mechanical bond. In some embodiments, the material of the bonding ply layer 305 creeps into the material of the reinforcement layer during the manufacturing process and thereby creates a mechanical bond between the two layers once the bonding ply layer 305 is hardened. For example, when the reinforcement layer 310 is a fabric reinforcement layer with a relatively open construction, the material of the bonding ply layer 305 will creep into the interstitial spaces of the fabric reinforcement layer to thereby provide the mechanical bond between the two layers.

The reinforcement layer 310 can be any suitable reinforcement material or combination of reinforcement materials. In some embodiments, the reinforcement material is a fabric reinforcement material. Suitable fabric reinforcement material layers include, but are not limited to, 20 oz. poly-straight cut, 20 oz. poly-bias cut, 20 oz. poly skimmed, nylon tire cord-straight, nylon tire cord-bias, Chlorobutyl-Fiberglass-Kevlar (CFK), Viton-Fiberglass-Kevlar (VFK), Nitrile-Fiberglass-Kevlar (NFK), Hypalon-Fiberglass-Kevlar (HFK), FDA neo-polyester, FDA butyl polyester, HNBR polyester, neo-polyester, chloro Kevlar cord, HNBR Kevlar cord, and HNBR/Nylon Tire cord.

In some embodiments, the reinforcement layer 310 is made up of multiple stacked layers of the same or different materials. Any number of layers in any combination of materials can be used. For example, the reinforcement layer can include two or more fabric layers with metal supporting layers disposed in between. The stack of layers making up the reinforcement layer can also include, for example, one or more butyl layers. In a specific example, a minimum of 4 plies of high quality tire cord (e.g., nylon tire cord), impregnated with compatible elastomers, are used to provide flexibility as well as durability.

The thickness of the reinforcement layer is generally not limited and can be adapted to suit the specific application of the flexible expansion joint. In some embodiments, the overall reinforcement layer has a thickness in the range of from 0.25 to 2 inches. In some embodiments, each layer of reinforced fabric used is 0.043" (0.053" in the case of skimmed layers).

In some embodiments, the thickness of the reinforcement layer is uniform throughout the flexible expansion joint. In other embodiments, the thickness of the reinforcement layer is variable at different portions of the flexible expansion joint. For example, the thickness of the reinforcement layer may be smaller or larger at the flanges 350 of the flexible expansion joint. The thickness of the reinforcement layer can also be varied (smaller or larger) at the gradual or short arch portion of the flexible expansion joint.

The outer layer 320 can be any suitable material or combination of materials that protect the flexible expansion joint against environmental conditions and/or mechanical damage. In some embodiments, the outer layer is a elastomeric compound. Suitable elastomeric compounds include, but are not limited to, chlorobutyl, natural rubber, neoprene, FDA neoprene, nitrile, FKM (Viton), FDA EPDM, CSM (Hypalon), EPDM, HNBR, or combinations thereof. In some embodiments, the outer layer is a material that meets ASTM D2000 4AA 610 A13 EA14.

In some embodiments, the outer layer 320 is made from an elastomeric compound having suitable flexibility such that the outer layer is suitable for use in a flexible expansion joint. Flexible expansion joints require flexibility so that they joints can move and adjust to vibrations and other movements in the fluid handling system. In some embodiments, the outer layer 320 has a similar or identical flexibility to the flexibility of the inner layer 300.

The thickness of the outer layer is generally not limited and can be adapted to suit the specific application of the expansion joint. In some embodiments, the outer layer has a thickness a minimum thickness of 1/16".

In some embodiments, the thickness of the outer layer is uniform throughout the flexible expansion joint. In other embodiments, the thickness of the outer layer is variable at different portions of the flexible expansion joint. For example, the thickness of the outer layer may be smaller or larger at the flanges 350 of the flexible expansion joint. The thickness of the outer layer can also be varied (smaller or larger) at the gradual or short arch portion of the flexible expansion joint.

The bond between the reinforcement layer 310 and the outer layer 320 can be any suitable bond that provides the necessary adhesion between layers. In some embodiments, each material has a sufficient tackiness that a sufficient physical bond is provided between the two materials. In other embodiments, a tacky substance (such as a solvent with millable urethane dissolved therein) can be provided between the two layers to assist in the bonding. In some embodiments, the outer layer 320 is sized such that it squeezes together the reinforcement layer, bonding ply layer, and inner most layer. In such embodiments, this squeezing force may provide sufficient mechanical bonding between the reinforcement layer and the outer layer.

In some embodiments, the reinforcement layer 310 and/or the outer layer 320 can be made from the same polyurethane material as the inner most layer. In an embodiments where the reinforcement layer is polyurethane material, the bonding ply layer 305 may not be necessary. In embodiments where both the reinforcement layer 310 and the outer layer 320 are made from polyurethane, the cross-section of the expansion joint may appear as one unitary mass of polyurethane material (optionally with various supporting materials, such as metal rings, disposed within the unitary mass).

For the abrupt arch expansion joint shown in FIG. 4, metal reinforcement can be included within the reinforced layer 310. The metal reinforcement may be metal wire or metal rectangular/round body rings. When wire is used, it can be coated with fabric in order to obtain proper bonding strength with the subsequent fabric and rubber plies. Flexible expansion joints under 5" ID may use 1/16" minimum diameter wire for reinforcement. Flexible expansion joints 5" ID and greater may use metal body rings that are minimum 1/4" in height.

In some embodiments, the flexible expansion joint includes only the four layers discussed above (i.e., inner most layer, reinforcement layer, outer layer). In some embodiments, additional layers can be included.

An optional external protective layer can also be included on either of the abrupt or flowing arch expansion joint. The external protective layer is aimed at impeding deterioration of the flexible expansion joint due to environmental conditions. The external protective layer can be an acrylic paint coating that exhibits excellent weathering characteristics without hindering the product's flexibility. The coating can be applied completely and uniformly.

Figure 7:
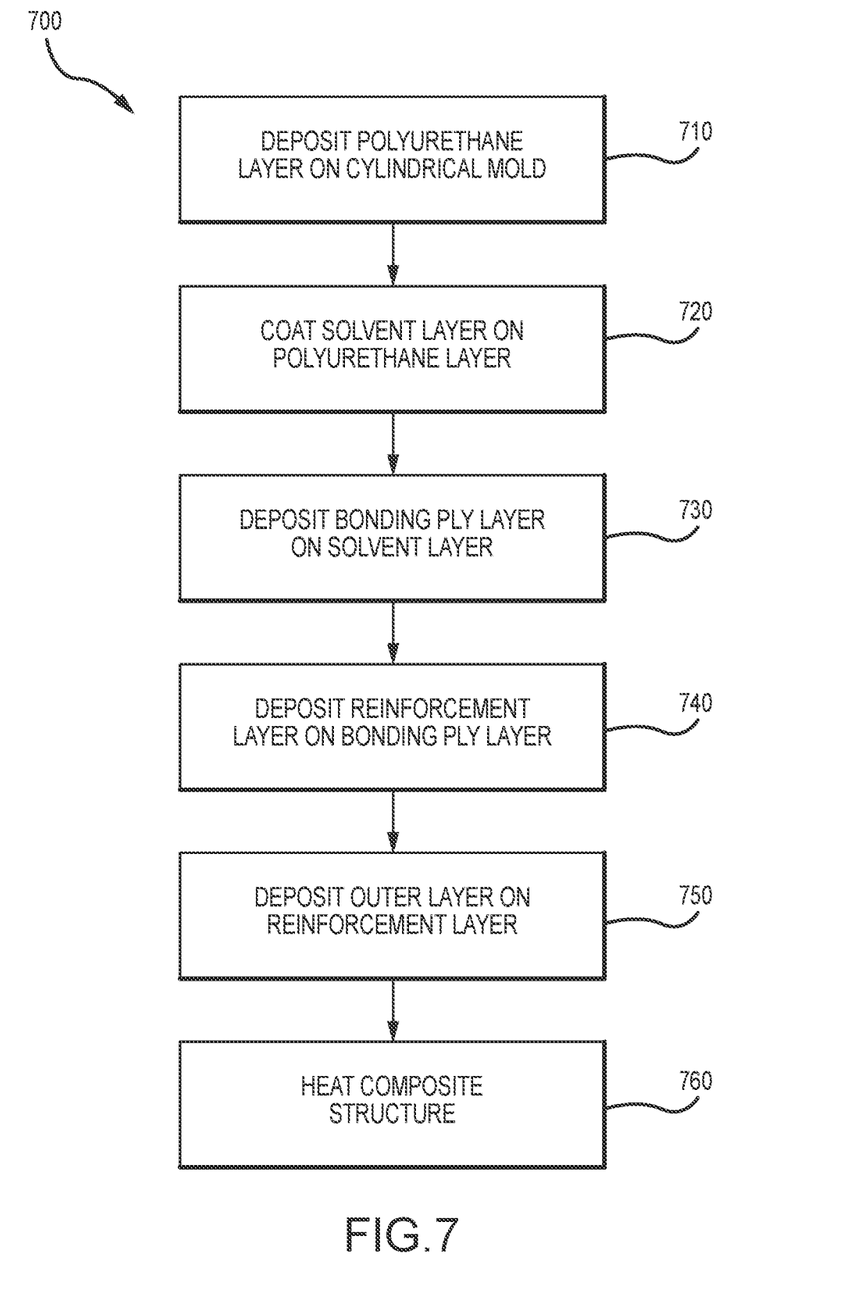
FIG. 7 is a flow chart illustrating a method of manufacturing an flexible expansion joint according to various embodiments described herein.

With reference to FIG. 7, a method 700 of manufacturing the flexible expansion joint can include a step 710 of depositing a polyurethane layer around a cylinder, a step 720 of coating the polyurethane layer with a solvent, a step 730 of depositing a bonding ply layer on the solvent layer, a step 740 of depositing a reinforcement layer on the bonding ply layer, a step 750 of depositing an outer layer on the reinforcement layer, and a step 760 of heating the composite structure. The sequential layering of this process forms a cylindrical composite structure that, when heated, forms together to result in a flexible expansion joint as described herein.

In step 710, a polyurethane layer is deposited on a cylindrical mold. For example, the polyurethane layer can have a length equal to the circumference of the cylindrical mold and a width equal to or less than the length of the cylindrical mold such that the layer of the polyurethane can be wrapped around the circumference of the cylindrical mold with little or no overlap.

The cylindrical mold can generally have a diameter equal to the desired inner diameter of the final flexible expansion joint. The cylindrical mold can be made of any suitable material. In some embodiments, the material of the cylindrical mold is selected such that the material of the inner most layer does not react with or otherwise adhere to cylindrical mold. Once the flexible expansion joint is formed, the expansion joint slides off the cylindrical mold, and therefore any type of bonding between the cylindrical mold and the expansion joint is undesirable.

The material of the polyurethane layer deposited on the cylindrical mold in step 710 can be similar or identical to the material described above with respect to inner most layer 300. In some embodiments, the polyurethane layer deposited on the cylindrical mold is millable polyurethane.

In step 720, a solvent layer is coated on top of the polyurethane layer. The solvent layer coating step is designed to prepare the polyurethane layer for chemical bonding with the bonding ply. In some embodiments, the solvent used in step 720 is any solvent that is capable of reacting with the polyurethane layer to provide the surface of the polyurethane layer with available bonding sites. In some embodiments, the solvent provides available bonding sites at the end of hydrocarbon chains at the surface of the polyurethane layer.

As noted above, any suitable solvent capable of providing bonding cites on the material of the inner most layer (e.g., polyurethane) can be used. In some embodiments, the solvent is methyl ethyl ketone (MEK). Other suitable solvents include heptane, acetone, and tert-butyl acetate. In some embodiments, a quantity of the material used as the inner most layer (e.g., polyurethane) is dissolved in the solvent.

In some embodiments, steps 710 and 720 are repeated one or more times. In such embodiments, a second layer of polyurethane is coated on top of the solvent layer provided in step 720, and then a second solvent layer is coated on top of the second polyurethane layer. Once the composite structure is heated, the solvent will disperse and the two layers of polyurethane will fuse together such that in the final product, only a single mass of polyurethane will be visible when looking at a cross sectional view of the product. Repeating these steps allows for providing a thicker inner most layer of the composite structure.

In step 730, a bonding ply layer is deposited on the solvent layer. The manner of depositing the bonding ply layer on the solvent layer is similar to how the polyurethane layer is deposited on the cylindrical mold (i.e., a sheet of the material can be wrapped around the material already deposited on the cylindrical mold). The bonding ply layer may be similar or identical to the bonding ply layer described above with respect to bonding ply layer 305. In some embodiments, the bonding ply layer is a layer of neoprene rubber. Once the bonding ply layer is deposited on the solvent, some chemical bonding between the bonding ply layer and the polyurethane begins to occur. However, full crosslinking of these two layers is generally not accomplished until after the heating step 760.

In step 740, the reinforcement layer is deposited on top of the bonding ply layer of step 730. The manner of depositing the reinforcement layer on the bonding ply layer is similar to how the polyurethane layer is deposited on the cylindrical mold (i.e., a sheet of the material can be wrapped around the material already deposited on the cylindrical mold). As discussed above, the reinforcement layer may include two or more layers of different materials, and therefore step 730 may include one or more sub steps in which each layer of the reinforcement layer is sequentially deposited on the material already wrapped around the mold.

As discussed above in greater detail above, the bonding between the bonding ply layer and the reinforcement layer is generally a mechanical bond. The creep of the bonding ply layer into the reinforcement layer may begin to occur once the reinforcement layer is formed, when pressure is applied to the composite structure (as described in greater detail below), and/or during the heating step 760. The final mechanical bond between the two layers is ultimately achieved after the material is heated and dried, such that the material of the bonding ply layer that creeps into the reinforcement layer solidifies.

In step 750, an outer layer is deposited on the reinforcement layer. The manner of depositing the outer layer on the reinforcement layer is similar to how the polyurethane layer is deposited on the cylindrical mold (i.e., a sheet of the material can be wrapped around the material already deposited on the cylindrical mold). The outer layer may be similar or identical to the outer layer described above with respect to outer layer 320.

In some embodiments, the method further includes wrapping the entire composite structure formed on the mold in a sheet material that squeezes the composite structure together prior to heating the composite structure. Any suitable material can be used, such as a high temperature cloth material capable of withstanding the heating step 760. The use of the wrapping material to squeeze together the layers of the composite structure helps to promote interactions between adjacent layers during the heating step.

In step 760, the composite structure is heated. The heating step can be carried out using any suitable heating apparatus, including but not limited to an oven. The heating step can be carried out at any suitable temperature and for any suitable period of time required to carry out interactions between adjacent layers that ultimately lead to some increased level of bonding (chemical, mechanical, or otherwise) between adjacent layers. The heating step promotes interaction between adjacent layers and formation of the final expansion joint product. In some embodiments, the heating step at least promotes additional chemical bonding between the polyurethane layer and the bonding ply layer.

The solvent layer used between the polyurethane layer and the bonding ply layer in step 720 can optionally be used between other layers of the composite structure. For example, in some embodiments a solvent layer similar or identical to the solvent layer in step 720 is provided between the reinforcement layer and the outer layer in order to provide tackiness and mechanical bonding between the two layers.

After the heating step 760, the wrapping material (if used) is removed and the expansion joint is removed from the cylindrical mold.

The above disclosed process describes one way in which the flexible expansion joint can be manufactured. Other processes known to those of ordinary skill in the art, such as molding, calendaring, extruding, etc., can also be used to manufacture the above disclosed expansion joint.

The polyurethane material is used predominately in the inner most layer of the expansion joint to protect the fabric reinforcement against abrasive media. Precautionary methods are taken during the manufacturing process to ensure a strong bond between layers to reduce the risk of delamination and failure. Generally speaking, various rubber cements can be used to adhere the layers together. Strong bonds between layers can be obtained by using a formulation of neoprene rubber cement to adhere the polyurethane material to other layers of the expansion joint. The bond between polyurethane and Neoprene compounds will allow the expansion joints to perform under vacuum, as well as provide longer service life than what is seen in the market today.

Expansion joints as described herein have excellent abrasion resistance. Standard Din abrasion, Picco abrasion, and Taber abrasion test results are excellent compared to other conventional elastomers. In some laboratory tests, the Picco abrasion measurements are improved by a multiple of greater than 2 when comparing an expansion joint having a natural rubber inner lining to an expansion joint as described herein.

The polyurethane used in the expansion joints has excellent strength properties with tensile values over 4,000 psi. The very high tensile strength also gives excellent tear and cut resistant properties. In many applications, sharp particles will typical cut and tear an elastomer which causes failure of the product. In many applications this cutting and tearing is considered abrasion of the elastomer. Expansion joints using polyurethane can resist this cutting and tearing due to the tensile strength.

Pinch Valve

Figure 5:
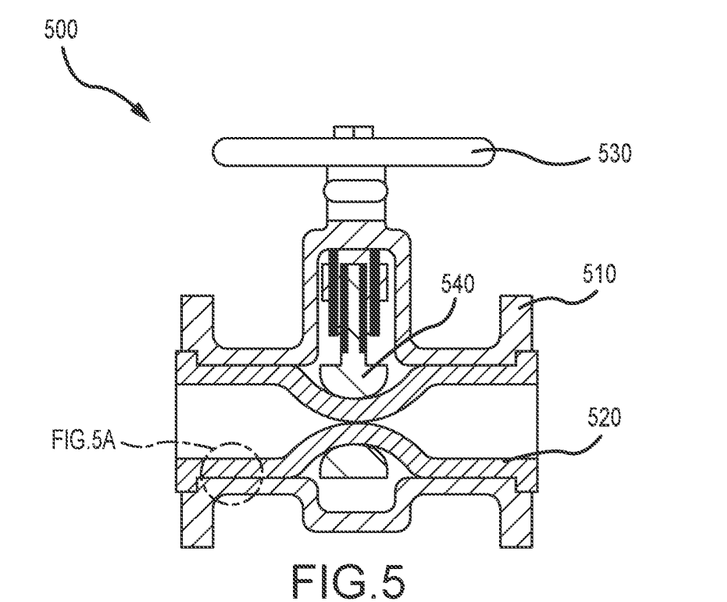
FIG. 5 is a cross-sectional view of a pinch valve according to various embodiments described herein.

With reference to FIG. 5, a pinch valve 500 according to various embodiments described herein is shown. The pinch valve 500 generally includes an outer shell portion 510 in the general shape of a cylinder with a hollow passage extending therethrough. A cylindrical flexible sleeve 520 is positioned within the shell portion 510 and is generally aligned coaxially with the shell 510. In some embodiments, the sleeve 520 has an outer diameter roughly equal to the inner diameter of the shell 510 such that the sleeve 520 rides against the inner surface of the shell 510. The pinch valve 500 further includes a wheel 530 operatively connected to a depresser 540. The depresser 540 is aligned perpendicular to the longitudinal axis of the shell 510. Turning the wheel 530 moves the depresser 540 into or out of the shell 510. When the depresser 540 moves into the shell 510, it presses against the sleeve 520, which is flexible and therefore moves inwardly with the depresser 540. As shown in FIG. 5, the depresser 540 may include a corresponding portion 540a that is also operatively connected to the wheel 530. The corresponding portion 540a moves into the shell 510 in concert with the depresser 540 and thereby pushes up on the opposite side of the sleeve 520. The depresser 540 and corresponding portion 540a will ultimately bring opposite sides of the sleeve 520 together and close off the passage of fluid through the sleeve 510. In this manner, the pinch valve 500 can reduce or stop flow of fluid through a fluid handling system.

Figure 5A:
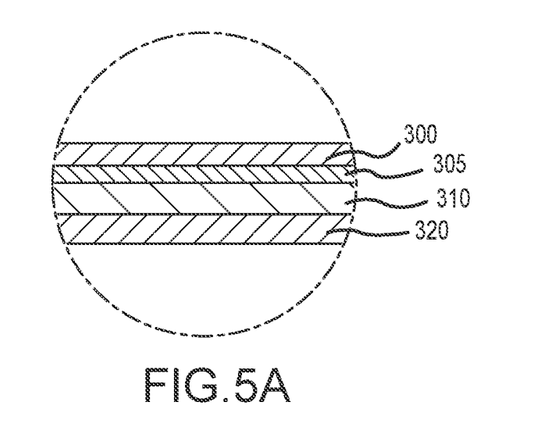
FIG. 5A is an enlarged cross-sectional view of a portion of the pinch valve shown in FIG. 5.

The sleeve 510 may have a four layer structure that is similar or identical to the four layer structure described above with respect to the expansion joint. Thus, as shown in FIG. 5, the flexible sleeve 520 may include an inner most layer 300, a bonding ply layer 305, a reinforcement layer 310 and an outer layer 320. Each layer of the four layer structure may be similar or identical to the layers described above with respect to the expansion joint, including the manner in which adjacent layers bond to one another. In some embodiments, the inner most layer 300 of the flexible sleeve 520 is polyurethane, and more specifically, millable polyurethane. As with the expansion joint, use of polyurethane for the inner most layer 300 allows the pinch valve 500 to be used in conjunction with highly abrasive fluids.

Hose

Figure 6:
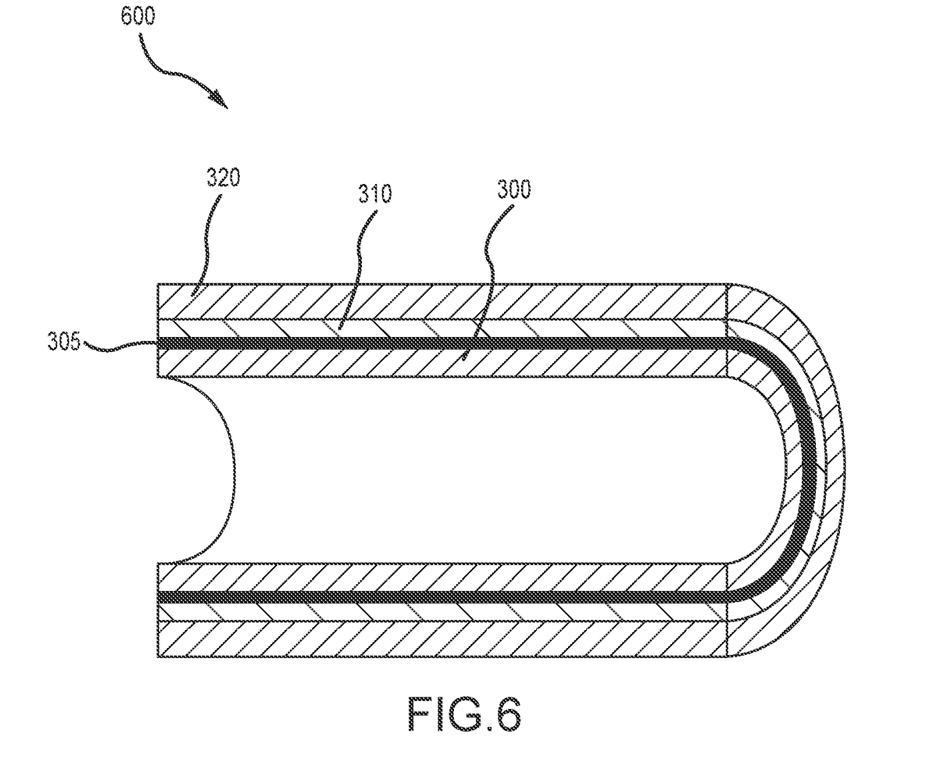
FIG. 6 is a cross-sectional view of a hose according to various embodiments described herein.

With reference to FIG. 6, a flexible hose 600 according to various embodiments described herein is shown. The hose has a generally cylindrical shape with a hollow passage extending therethrough. The length and diameter of the hose are generally not limited and can be selected based on the needs of the particular fluid handling system within which the hose is used. The hose generally provides a passage for fluid to be transported over a distance. Because the hose is generally flexible, it can be used to transport fluid around or over obstructions.

The hose 600 may have a four layer structure that is similar or identical to the four layer structure described above with respect to the expansion joint. Thus, as shown in FIG. 6, the hose may include an inner most layer 300, a bonding ply layer 305, a reinforcement layer 310, and an outer layer 320. Each layer of the four layer structure may be similar or identical to the layers described above with respect to the expansion joint, including the manner in which adjacent layers bond to one another. In some embodiments, the inner most layer 300 of the flexible hose 600 is polyurethane, and more specifically, millable polyurethane. As with the expansion joint, use of polyurethane for the inner most layer 300 allows the hose 600 to be used in conjunction with highly abrasive fluids.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A flexible expansion joint comprising:
   an inner most layer comprising polyurethane;
   a reinforcement layer; and
   an outer layer;
   wherein the flexible expansion joint is a flowing arch expansion joint.

2. The flexible expansion joint of claim 1, wherein the polyurethane is millable polyurethane.

3. The flexible expansion joint of claim 1, wherein the inner most layer consists of polyurethane.

4. The flexible expansion joint of claim 1, wherein the inner most layer comprises greater than 70 wt % polyurethane.

5. The flexible expansion joint of claim 1, wherein the polyurethane of the inner most layer is produced by reacting diisocyanate with a polyol and a chain extender, and wherein the polyol is only or predominantly polyether polyols.

6. The flexible expansion joint of claim 1, wherein the polyurethane of the inner most layer is produced by reacting diisocyanate with a polyol and a chain extender, and wherein the polyol includes polyester polyols.

7. The flexible expansion joint of claim 2, wherein the reinforcement layer comprises fabric reinforcement material.

8. The flexible expansion joint of claim 2, wherein the outer layer comprises an elastomeric compound.

9. A flexible expansion joint comprising:
   an inner most layer comprising polyurethane;
   a reinforcement layer; and
   an outer layer;
   wherein the flexible expansion joint is an abrupt arch expansion joint.

10. The flexible expansion joint of claim 9, wherein the polyurethane is millable polyurethane.

11. The flexible expansion joint of claim 9, wherein the inner most layer consists of polyurethane.

12. The flexible expansion joint of claim 9, wherein the inner most layer comprises greater than 70 wt % polyurethane.

13. The flexible expansion joint of claim 9, wherein the polyurethane of the inner most layer is produced by reacting diisocyanate with a polyol and a chain extender, and wherein the polyol is only or predominantly polyether polyols.

14. The flexible expansion joint of claim 9, wherein the polyurethane of the inner most layer is produced by reacting diisocyanate with a polyol and a chain extender, and wherein the polyol includes polyester polyols.

15. The flexible expansion joint of claim 10, wherein the reinforcement layer comprises fabric reinforcement material.

16. The flexible expansion joint of claim 10, wherein the outer layer comprises an elastomeric compound.

* * * * *